United States Patent [19]

Izumi

[11] Patent Number: 4,499,962
[45] Date of Patent: Feb. 19, 1985

[54] REMOVABLE HOPPER MECHANISM IN AN AUTOMATIC WEIGHING APPARATUS

[75] Inventor: Asashiro Izumi, Kusatsu, Japan
[73] Assignee: Kabushiki Kaisha Ishida Koko Seisakusho, Kyoto, Japan
[21] Appl. No.: 419,920
[22] Filed: Sep. 20, 1982

[30] Foreign Application Priority Data

Sep. 21, 1981 [JP] Japan .................... 56-140663[U]

[51] Int. Cl.³ .................... G01G 19/22; G01G 21/28
[52] U.S. Cl. ...................................... 177/58; 177/128
[58] Field of Search ............................... 177/105-113, 177/128, 58

[56] References Cited

U.S. PATENT DOCUMENTS 3,057,382 10/1962 Baker ............................ 177/58 X
4,393,950 7/1983 Klopfenstein et al. ............ 177/108

Primary Examiner—E. A. Goldberg
Assistant Examiner—Patrick W. Foster

Attorney, Agent, or Firm—Staas & Halsey

[57] ABSTRACT

A combinatorial automatic weighing apparatus has a plurality of weighing machines each including a pool hopper and a weighing hopper which are removable from a driver unit and a weighing mechanism, respectively. The pool hopper has removable guide plates for guiding articles as supplied from a dispersing table of the weighing apparatus, and also has on its outer sidewall guide members removably held in sliding engagement with a support bracket attached to the driver unit mounted on a tiltable stand supported on a frame. The pool hopper has a bottom cover drivable by the driver unit through a lever mechanism composed of disengageable levers. The weighing hopper has on its outer sidewall guide members removably held in sliding engagement with a support bracket secured to the weighing mechanism. The pool hopper and the weighing hopper can easily be removed for easy and thorough cleaning thereof.

12 Claims, 4 Drawing Figures

REMOVABLE HOPPER MECHANISM IN AN AUTOMATIC WEIGHING APPARATUS

BACKGROUND OF THE INVENTION

The present invention relates to a removable hopper mechanism in an automatic weighing apparatus, and more particularly to a removable hopper mechanism in a combinatorial automatic weighing or counting apparatus comprising a plurality of weighing machines disposed in circumferentially spaced locations around a dispersing table and a collection chute for weighing or counting articles as supplied from the dispersing table to select an optimum combination of batches of articles and for discharging the selected batches of articles through the collection chute.

Known combinatorial automatic weighing apparatus have pool and weighing hoppers fixedly mounted on respective weighing machines at one side thereof. Where articles to be weighed are sticky in nature, or after the apparatus has been used over a long period of time, articles tend to remain stuck to the hoppers. The deposited articles need to be cleaned off the hoppers which are fixed in position, a process which is tedious and time-consuming. In addition, the fixed hoppers cannot be cleaned thoroughly. It would be possible to remove the hoppers each time they require cleaning. However, they could not be detached with ease, and would need an undue expenditure of much labor for their removal.

SUMMARY OF THE INVENTION

According to the present invention, a removable hopper mechanism for an automatic weighing apparatus having a dispersing table for supplying articles, comprises a frame, a stand mounted on the frame, a driver unit mounted on the stand, a first support bracket attached to the driver unit, a pool hopper for receiving articles from the dispersing table, the pool hopper having guide members removably engaging the first support and a bottom cover drivable by the driver unit, a weighing mechanism mounted on the frame, a second support bracket attached to the weighing mechanism, and a weighing hopper for receiving articles from the pool hopper to permit the weighing mechanism to weigh the articles received in the weighing hopper, the weighing hopper having guide members removably engaging the second support bracket and a bottom cover drivable by the driver unit.

It is an object of the present invention to provide a removable hopper mechanism in an automatic weighing apparatus which has weighing hoppers and pool hoppers removable so that they can easily and thoroughly be cleaned.

Another object of the present invention is to provide a removable hopper mechanism in an automatic weighing apparatus which includes a pool hopper support tiltable to facilitate removal of pool hoppers for their easy and thorough cleaning.

The above and other objects, features and advantages of the present invention will become more apparent from the followng description when taken in conjunction with the accompanying drawings in which a preferred embodiment of the present invention is shown by way of illustrative example.

DETAILED DESCRIPTION

Figure 1:
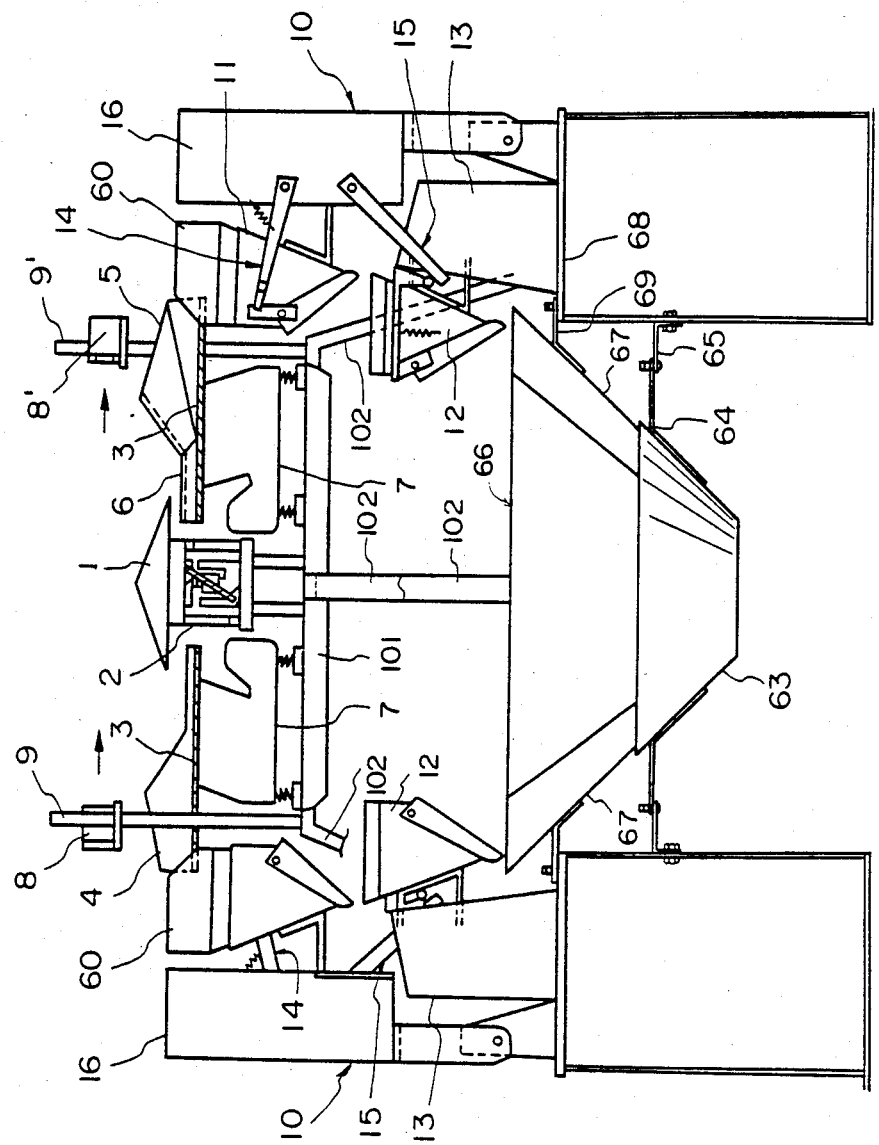
FIG. 1 is a side elevational view of a conventional combinatorial automatic weighing apparatus.

FIG. 1 illustrates a conventional combinatorial automatic weighing apparatus having hoppers. The weighing apparatus comprises a dispersing table 1 of a conical shape supported on an electromagnetic vibratory device 2, and a plurality of radially extending supply troughs 3 arranged around the dispersing table 1 in angularly spaced relation, the supply troughs 3 having radially inward ends underlying an outer peripheral edge of the dispersing table 1 in close proximity thereto. Each supply trough 3 has a radial passage defined by a vertical inverted V-shaped wall 4 and a slanted wall including an inverted V-shaped wall portion 5 extending approximately two-thirds of the entire length of the slanted wall and inclined outwardly and a wall portion 6 extending approximately one-third of the entire length of the slanted wall along the vertical wall 4 of an adjacent one of the supply troughs 3. The slanted wall portions 5, 6 are disposed in overhanging relation to and spaced from the vertical wall 4 of the adjacent supply trough 3.

The supply troughs 3 are supported respectively on electromagnetic vibratory units 7. The electromagnetic vibratory device 2 and the electromagnetic vibratory units 7 are mounted on a support table 101 fixed to four support legs 102 secured to a frame 68. The support table 101 supports thereon a post 9 on which a light-emitting device 8 is mounted and a post 9' on which a photodetector 8' is mounted, the posts 9, 9' being diametrically symmetrically positioned with respect to the dispersing table 1. The weighing apparatus further comprises a plurality of weighing machines 10 mounted on the frame 68 in angularly spaced relation and positioned radially outwardly of the supply troughs 3. Each of the weighing machines 10 is composed of a pool hopper 11 for receiving articles from the corresponding supply trough 3, a weighing hopper 12 for receiving the articles from the pool hopper 11, a weighing mechanism 13 for weighing the articles contained in the weighing hopper 12, and a driver unit 16 having lever mechanisms 15, 14 for opening and closing the weighing hopper 12 and the pool hopper 11. The pool hopper 11 has upper guide plates 60 between which a radially outward end of the supply trough 3 is located so that the articles can reliably fall off the supply trough 3 into the pool hopper 11. A collection chute 66 has a plurality of unit chutes 67 located in circumferentially spaced positions and having upper openings sized largely enough to admit articles supplied from the weighing hoppers 12. The unit chutes 67 have lower ends projecting downwardly into a funnel-shaped lower chute 63, the unit chutes 67 being inclined at the same angle as that of inclination of the wall of the funnel-shaped lower chute 63. The unit chutes 67 are fastened to the frame 68 by brackets 69 fixed to lower inclined walls of the unit chutes 67. The lower chute 63 is secured to the frame 68 by brackets 64, 65.

In operation, articles supplied onto the dispersing table 1 are dispersed into the supply troughs 3 in response to operation of the electromagnetic vibratory device 2. The supply troughs 3 are vibrated by the electromagnetic vibratory units 7 to supply the articles from the supply troughs 3 into the corresponding pool hoppers 11, from which the articles are then allowed to fall into the associated weighing hoppers 12. The articles thus received in the weighing hoppers 12 are weighed in a variety of batch combinations of articles by an electronic circuit, which then selects a batch combination which gives a total article weight equal or closest to a preset weight. Then, those weighing hoppers 12 which corresponds to such a selected batch combination are opened to discharge the articles therefrom into the chutes 66, 63, from which they are delivered onto a conveyor or packing machine (not shown). Articles are supplied onto the dispersing table 1 by a non-illustrated feed conveyor under the control of transmission or interruption of optical signals from the light-emitting device 8 to the photodetector 8', so that a constant number of articles will remain stocked at all times on the dispersing table 1.

Figure 2:
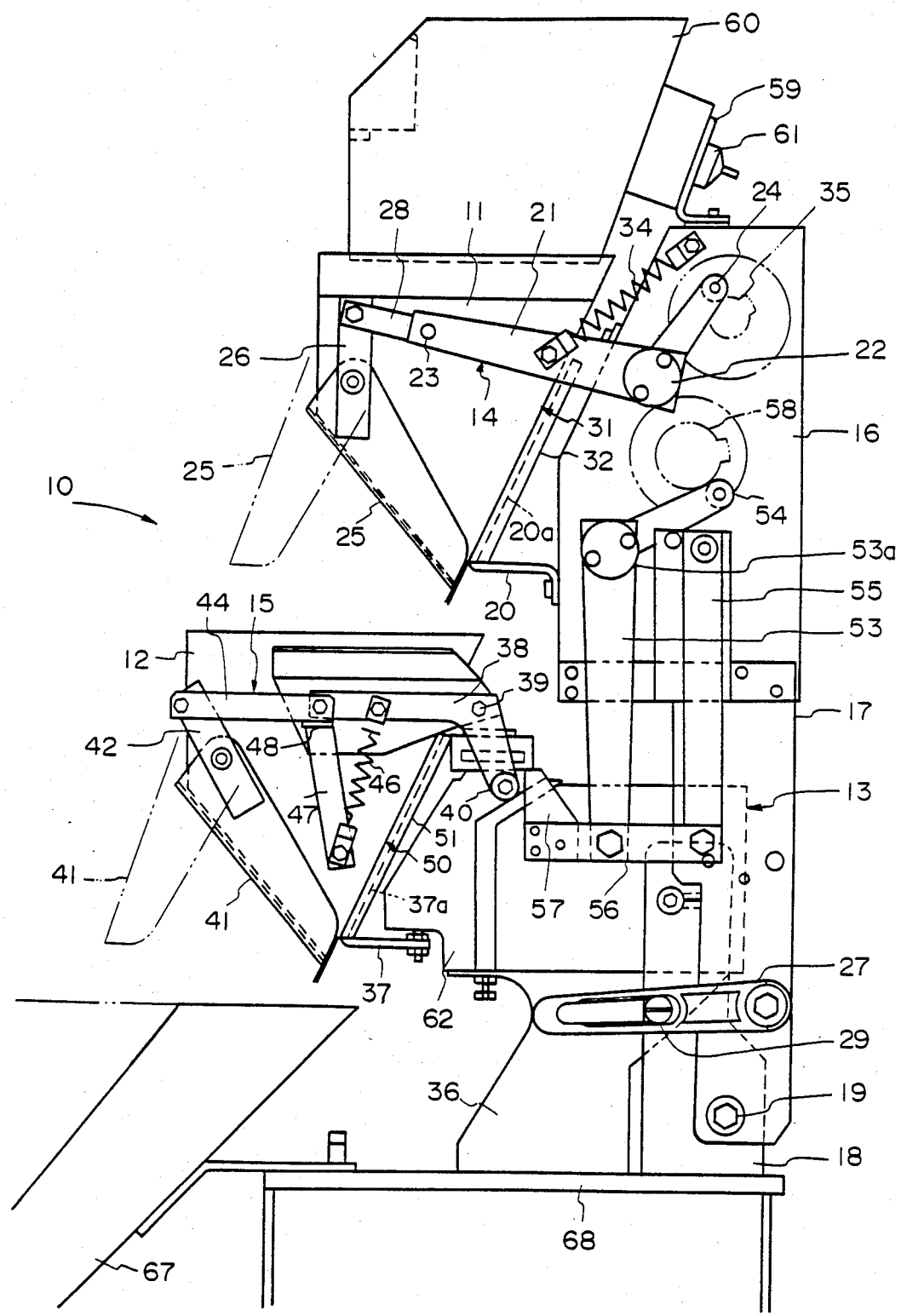
FIG. 2 is a fragmentary enlarged side elevational view of an automatic weighing machine according to the present invention.
Figure 3:
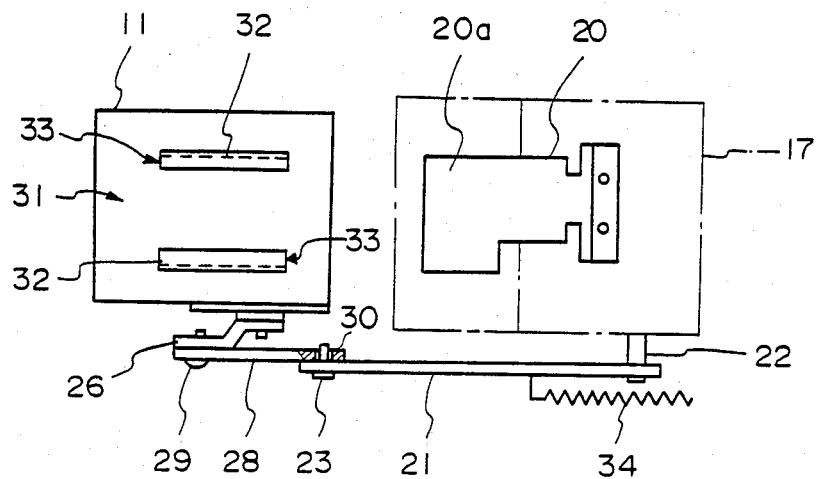
FIG. 3 is a plan view showing the manner in which a hopper is to be coupled to a support bracket in the weighing machine shown in FIG. 2.
Figure 4:
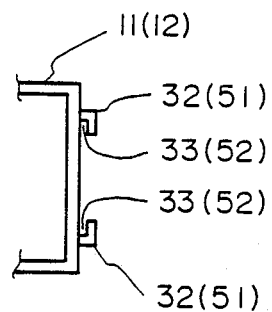
FIG. 4 is a fragmentary end view of a hopper.

FIGS. 2 through 4 show a weighing machine according to the present invention. Identical or corresponding parts shown in FIGS. 2 through 4 are denoted by identical or corresponding reference characters in FIG. 1.

As shown in FIG. 2, a weighing machine 10 has a driver unit 16 supported on a stand 17 pivotably mounted on an attachment bracket 18 mounted vertically on a frame 68. A support bracket 20 is secured to a radially inward surface of the driver unit 16 and has a bent configuration including a slanted upstanding portion 20a extending at the same angle as that of inclination of an outer sidewall 31 of a pool hopper 11 which faces the driver unit 16. A lever mechanism 14 is composed of a substantially L-shaped swing lever 21 having a pivot 22 by which the swing lever 21 is pivotably mounted on a sidewall of the driver unit 16. The L-shaped swing lever 21 includes a first arm having a distal end on which an end of a lever 28 is pivotably mounted by a pin 23, and a second arm having a distal end on which a roller 24 is rotatably supported, the pin 23 extending through a coupling hole 30 (FIG. 3) in the distal end of the swing lever 21. Accordingly, the lever 28 is removable from the swing lever 21. The other end of the lever 28 is pivotably attached to an end of a bracket 26 pivotably mounted on the pool hopper 11 and secured to a bottom cover 25 of the latter for angular movement in unison. A pair of elongate guide members 32 of an L-shaped cross section (FIGS. 3 and 4) are attached longitudinally to the outer sidewall 31 of the pool hopper 11. The guide members 32 and the outer sidewall 31 of the pool hopper 11 jointly define a pair of guide slots 33 in which lateral edges of the slanted upstanding portion 20a of the support bracket 20. A spring 34 is connected between the swing lever 21 and an upper portion of the driver unit 16 for normaly urging the lever 21 to turn clockwise as shown in FIG. 2. The driver unit 16 includes a drivable cam 35 having a cam projection which, when engaged with the roller 24, turns the swing lever 21 counterclockwise against the force of the spring 34 to thereby enable the lever 28 and the bracket 26 to open the bottom cover 25.

A base 36 is mounted on the frame 68 and supports thereon a load cell 62 serving as a weighing mechanism.

A support bracket 37 is secured to the load cell 62 and has a configuration similar to that of the support bracket 20. Thus, the support bracket 37 includes a slanted upstanding portion 37a inclined at the same angle as that of inclination of a sidewall 50 of a weighing hopper 12 facing the load cell 62. A lever mechanism 15 is in the form of a substantially L-shaped swing lever 38 having a pivot 39 by which the swing lever 38 is pivotably mounted on an upper portion of the load cell 62. The swing lever 38 has a roller 40 rotatably supported on one end thereof, there being a lever 44 having one end pivotably mounted on the other end of the swing lever 38. The lever 44 is pivotably mounted on an end of a bracket 42 pivotably supported on the weighing hopper 12 and attached to a bottom cover 41 of the weighing hopper 12 for angular movement therewith. The lever 38 is normally urged to turn counterclockwise as shown in FIG. 2 by a spring 46 acting between a central portion of the lever 38 and a lower side surface of the weighing hopper 12. To a side surface of the weighing hopper 12, there is attached a bar 47 having on an upper end thereof a stop 48 engageable with the pivotably coupled ends of the levers 38, 44 to limit counterclockwise angular movement of the swing lever 38. A pair of elongate guide members 51 are secured to the wall 50 of the weighing hopper 12 and cooperate with the wall 50 in defining a pair of guide slots 52 as with the guide members 32, as illustrated in FIG. 4. A substantially L-shaped swing lever 53 has a pivot 53a pivotably mounted on a side surface of the driver unit 16 and includes a first arm on which a roller 54 is rotatably supported and a second arm to which a connector link 56 is centrally attached for pivotable movement. Another swing link 55 is pivotably mounted on the driver unit 16 and extends parallel to the swing link 53, the swing link 55 having an upper end located at substantially the same height as that of the pivot 53a of the swing link 53. The connector link 56 has an end located adjacent to the stand 17 and pivotably mounted on the swing link 55. Thus, the swing links 53, 55 and the connector link 56 jointly constitute a parallel link mechanism. The connector link 56 has on the other end a presser 57 engageable with the roller 40 on the swing lever 38. The driver unit 16 has a drivable cam 58 including a cam projection which, upon engagement with the roller 54, angularly moves the parallel link mechanism clockwise as shown in FIG. 2 to force the presser 57 to push the roller 40 until the bottom cover 41 is opened through the action of the swing lever 38, the lever 44 and the bracket 42. An attachment 59 is fixed to an upper end of the driver unit 16 and supports guide plates 60 in a fixed position by means of a screw 61. The stand 17 is supported by a lever 27 fastened to the bracket 18 by a screw 29.

The weighing machine thus constructed will operate as follows: When the cam 35 rotates upon operation of the driver unit 16, the swing lever 21 is turned counterclockwise to pull down the lever 28, thereby angularly moving the bracket 26 and hence the bottom cover 25 to open the latter to the dot-and-dash-line position (FIG. 2). When the cam 58 rotates, the parallel link mechanism which is composed of the levers 53, 55, 56 is angularly moved clockwise to cause the presser 57 to push the roller 40 for turning the swing lever 38 clockwise about the pivot 39. The lever 44 is then pulled up to turn the bracket 42 and hence the bottom cover 41 clockwise for opening the latter to the dot-and-dash-line position as shown in FIG. 2.

When the pool hopper 11 and the weighing hopper 12 are to be removed for cleaning purpose or the like, the screw 29 is loosened to permit the stand 17 to be inclined through a given angle, and then the screw 61 is detached to remove the guide plates 60. Thereafter, the swing lever 21 and the lever 28 are disconnected from each other, and the pool hopper 11 is pulled up along the slanted upstanding portion 20a of the support bracket 20 until the pool hopper 11 is disengaged from the slanted upstanding portion 20a. With the stand 16 inclined, there is no obstacle to upward removal of the weighing hopper 12, which is then pulled upwardly until disengaged from the support bracket 37. The pool hopper 11 can easily be removed as it is only held in engagement with the slanted upstanding portion 20 of the support bracket 20.

With the arrangement of the present invention, the pool hopper can be removed when the weighing machine is inclined, and the weighing hopper can be removed simply by being pulled upwardly. Accordingly, the pool and weighing hoppers can be washed quite easily and thoroughly to clean off deposited articles.

Although a certain preferred embodiment has been shown and described in detail, it should be understood that many changes and modifications may be made therein without departing from the scope of the appended claims.

What I claim is:

1. A removable hopper mechanism for an automatic weighing apparatus having a dispersing table for supplying articles, a pool hopper for receiving articles from the dispersing table, a weighing hopper for receiving articles from said pool hopper and a weighing mechanism for weighing the articles received in said weighing hopper, comprising:
    a frame;
    a stand tiltably mounted on said frame;
    a driver unit mounted on said stand;
    a support bracket attached to said driver unit;
    said pool hopper having guide members removably engaging said support bracket, a bottom cover drivable by said driver unit and guide plates removably mounted on said driver unit for guiding articles as supplied from the dispersing table into said pool hopper;
    a first lever mechanism by which said driver unit and said bottom cover of said pool hopper are operatively interconnected, said first lever mechanism comprising disengageable levers; and
    a second lever mechanism by which said driver unit and said bottom cover of said weighing hopper are operatively interconnected, said second lever mechanism comprising a first lever operatively coupled with said bottom cover and having a roller, and a second lever operatively coupled with said driver unit and having a presser for engaging said roller when the bottom cover is to be driven by said driver unit.

2. A removable hopper mechanism for an automatic weighing apparatus having a dispersing table for supplying articles, a pool hopper for receiving articles from said pool hopper and a weighing mechanism for weighing the articles received in said weighing hopper, said mechanism comprising:
    a frame;
    a stand mounted on said frame;
    a driver unit mounted on said stand;
    a support bracket attached to said weighing mechanism;
    guide members attached to said weighing hopper and removably engaging said support bracket; and
    a bottom cover drivable by said driver unit.

3. A removable hopper mechanism for an automatic weighing apparatus as recited in claim 1, wherein said guide members comprise a pair of guides L-shaped in cross-section which are attached longitudinally to the outer side wall of said pool hopper.

4. A removable hopper mechanism for an automatic weighing apparatus as recited in claim 3, wherein said weighing hopper is arranged underneath said pool hopper.

5. A removable hopper mechanism for an automatic weighing apparatus having a dispersing table for supplying articles, a pool hopper for receiving articles from the dispersing table, a weighing hopper for receiving articles from said pool hopper and a weighing mechanism for weighing the articles received in said weighing hopper, said removable hopper mechanism comprising:
    a frame;
    a stand mounted on said frame;
    a driver unit mounted on said stand;
    said pool hopper having a bottom cover drivable by said driver unit;
    a support bracket attached to said driver unit; and
    guide members removably and slidably engaging said support bracket, and attached longitudinally to the outer sidewall of said pool hopper allowing said pool hopper to be removed.

6. A removable hopper mechanism for an automatic weighing apparatus as recited in claim 5, wherein said guide members comprise a pair of guides L-shaped in cross-section.

7. A removable hopper mechanism for an automatic weighing apparatus as recited in claim 6, wherein said stand includes a mounting device for tiltably mounting said stand on said frame.

8. A removable hopper mechanism for an automatic weighing apparatus as recited in claim 7, wherein said weighing hopper is arranged underneath said pool hopper.

9. A removable hopper mechanism for an automatic weighing apparatus having a dispersing table for supplying articles, a pool hopper for receiving articles from the dispersing table, a weighing hopper for receiving articles from said pool hopper and a weighing mechanism for weighing the articles received in said weighing hopper, said removable hopper mechanism comprising:
    a frame;
    a base mounted on said frame;
    said weighing mechanism mounted on said base;
    a support bracket attached to said weighing mechanism; and
    guide members removably and slidably engaging said support bracket, and attached longitudinally to the outer sidewall of said weighing hopper allowing said weighing hopper to be removed.

10. A removable hopper mechanism for an automatic weighing apparatus as recited in claim 9, wherein said guide members comprise a pair of guides L-shaped in cross-section.

11. A hopper system mounted above a collection chute in an automatic weighing apparatus, comprising:
    a drive unit having a support bracket fixed thereon;

a pool hopper having a bottom cover and guide members for slidably engaging the support bracket of said pool hopper;

a weighing unit having a support bracket fixed thereon;

a weighing hopper having a bottom cover and guide members for slidably engaging the support bracket of said weighing unit; and disengageable linking means, engageably coupled to the bottom covers of said pool and weighing hoppers and said drive unit, for opening and closing the bottom cover of said pool and weighing hoppers and for disengaging when the guide members of said pool and weighing hoppers are disengaged from the support brackets of said drive and said weighing units, respectively.

12. A hopper system as recited in claim 13, wherein each of the guide members comprise a pair of L-shaped guides for slidably engaging the respective support bracket.

* * * * *

UNITED STATES PATENT AND TRADEMARK OFFICE
CERTIFICATE OF CORRECTION

PATENT NO. : 4,499,962
DATED : February 19, 1985
INVENTOR(S) : Izumi

It is certified that error appears in the above-identified patent and that said Letters Patent is hereby corrected as shown below:

On the title page;

(73) Assignee: "KOKO" s/b --KOKI--.

(56) References Cited insert --4,398,612  8/1983  MIKAMI et al.  177/58--.

Col. 1

Line 65, "followng" s/b --following--.

Col. 5

Line 15, "20" s/b --20a--.

Signed and Sealed this

Twentieth Day of August 1985

[SEAL]

Attest:

DONALD J. QUIGG

Attesting Officer

Acting Commissioner of Patents and Trademarks